Mar. 27, 1923.
A. A. ADAMS.
SELF ADJUSTING BOLT.
FILED NOV. 17, 1921.
1,449,484.
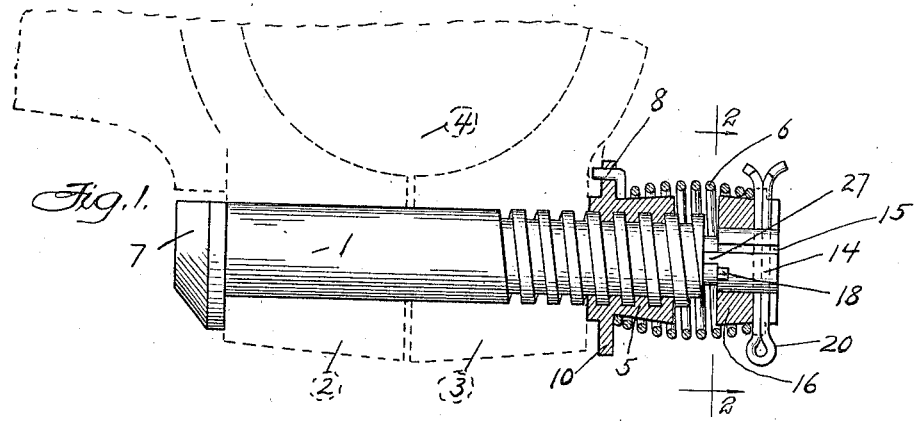
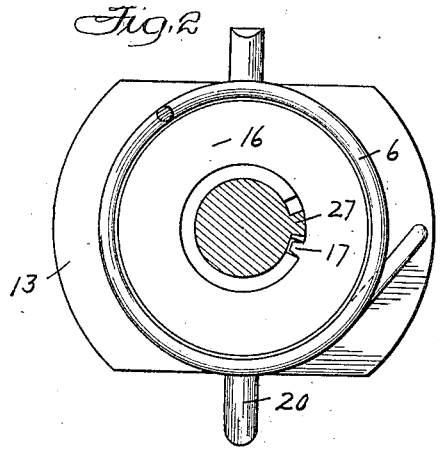
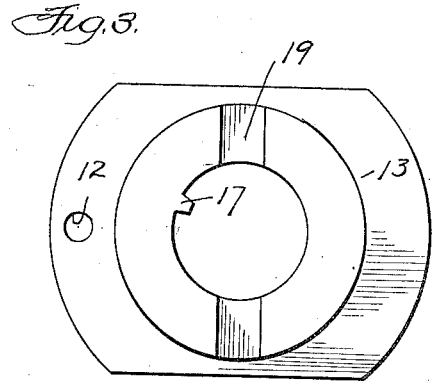
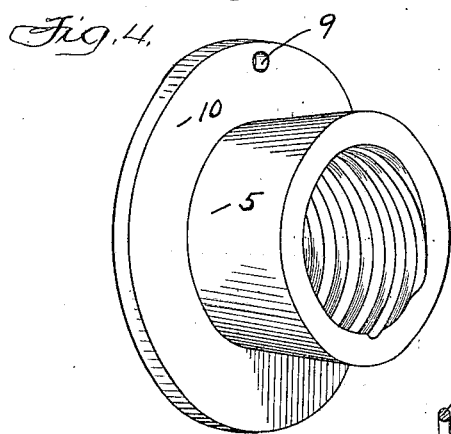
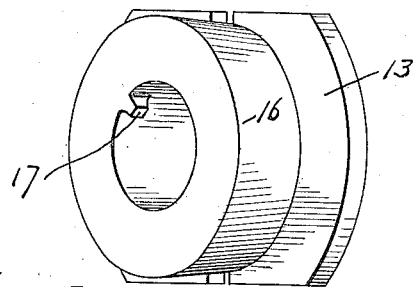
Inventor:
Albert A. Adams
by Albert Scheible
Attorney
Witness:
Wm. Olson Patented Mar. 27, 1923.

1,449,484

UNITED STATES PATENT OFFICE.

ALBERT A. ADAMS, OF DAVENPORT, IOWA.

SELF-ADJUSTING BOLT.

Application filed November 17, 1921. Serial No. 515,779.

*To all whom it may concern:*

Be it known that I, ALBERT A. ADAMS, citizen of the United States, residing at Davenport, in the county of Scott and State of Iowa, have invented certain new and useful Improvements in a Self-Adjusting Bolt; and I do hereby declare the following to be a full, clear, and exact description of the invention, such as will enable others skilled in the art to which it appertains to make and use the same.

My invention relates to bolts or fastening means of the general class in which the fastening is effected by a nut mounted on a threaded shaft. Generally speaking, my invention aims to provide simple, easily manipulated and highly effective means for causing the nut to tighten itself automatically upon the bolt in response to a yielding of the parts connected by the same, and also aims to provide a bolt having a nut which can readily be affixed and tightened without employing a wrench and which therefore can readily be attached or detached in positions which are difficult to access.

Further and more detailed objects will appear from the following specification and from the accompanying drawings, in which Fig. 1 is a central and longitudinal section through a self-adjusting bolt embodying my invention, with dotted lines showing the position of the adjacent parts of a connecting rod on which the bolt is being used.

Fig. 2 is an enlarged section taken transversely of Fig. 1 along the line 2—2 of that figure and looking towards the latching member which is non-rotatably secured to the shank of the bolt.

Fig. 3 is a correspondingly enlarged elevation of the same latching member taken from its free end or from the right hand end of Fig. 1.

Fig. 4 is a perspective view of the threaded nut used on the bolt.

Fig. 5 is a perspective view of the aforesaid latching member.

Fig. 6 is a fragmentary section of the free end portion of the bolt and of the parts adjacent thereto, showing how the outer end of the spring is interlocked with the latching member.

Where bolts are used for connecting parts gradually subjected to wear, as for example on the connecting rods of engines, it is important that these should be tightened occasionally to take up the wear, as a hammering or pounding action will otherwise result and will be apt to cause damage not only to the parts with which the bolt is directly associated but also to other parts of the mechanism. However, the average user of such an engine, particularly when the same is employed on an automobile, is not apt to pay proper attention to the adjustment of such parts until his attention is called to the same by the noise and jar of the knocking, by which time the main crank shaft bearings may also be effected so as to require considerable repair work. Furthermore, such repair work usually requires a tying up of the automobile and considerable expense, all of which could be avoided if the bolt automatically readjusted itself as the bearing wears.

For instance, Fig. 1 shows a bolt having a shank 1 extending through the connecting rod ends 2 and 3 so as to tighten these to a fair degree upon a crank pin 4, the tightening being effected through a nut threaded on the shank of the bolt. Instead of having the parts 2 and 3 bear directly against each other, I space them apart somewhat to permit the needed approaching when they adjust themselves for wear on the crank pin, and instead of locking the nut against rotation in both directions by a jam nut, I secure this nut against retraction through a spring 6 which has its other end fast with respect to the shank of the bolt and which is wound up sufficiently so that it continuously tends to rotate the nut in the direction in which the nut advances towards the main head 7 of the bolt.

For this latter purpose I desirably provide the spring with a forward end 8 projecting through a corresponding perforation 9 in a flange 10 on the nut 5 and provide the spring also with a rear end 11 projecting through a perforation 12 in a flange 13 on a latching member which is interlocked with the free end of the bolt. To accomplish this interlocking, I desirably provide the bolt shank with an unthreaded and substantially cylindrical end portion 14 spaced for the major portion of its periphery from the threaded portion of the shank by a peripheral groove, which groove is connected to the free end of the auxiliary head 14 of the bolt shank by a longitudinal groove 15. Then I provide the latching member 16 at its inner end (or the end opposite the said flange 13) with an inwardly directed finger 17 adapted to slide through the longitudinal groove 15 when the latching member is slipped over the auxiliary head of the bolt shank, so as to guide this latching groove 15 under the auxiliary head of the bolt. This peripheral groove desirably does not extend entirely around the bolt shank but leaves a stop wall portion 27 disposed substantially as shown in Fig. 1 for limiting the extent to which the latching finger can be rotated in the circumferential groove. I also provide the auxiliary head 14 with a notch 18 directed toward the threaded portion of the bolt shank and opening into the said peripheral groove, this notch being adapted to be entered by the latching finger 17.

With the parts thus arranged, and with the coiled spring hooked at each end into the corresponding perforations in the nut and the latching member, I first thread the nut into position and slide the latching member over the auxiliary head 14 until its finger enters the peripheral groove in the bolt shank, in doing which the spring 6 is compressed to some extent, the spring being made of such a length as to furnish such compression. I then rotate the latching member (in the same direction in which the nut is rotated when tightening on the bolt shank) until the latching pin 17 engages the stop wall 27 which desirably is laterally adjacent to the notch 18. With the latching member turned to this position, the compression of the spring then backs up the latching member so that it snaps the finger 17 into the notch 18, thereby preventing the latching member from rotating and holding the spring wound up to the extent to which it was rotated after slipping the finger 17 through the groove 15.

When thus attached, the tendency of the spring to unwind itself will continuously aim to tighten the nut upon the bolt, and the longitudinal pressure of the compressed spring will aid in this while also preventing any possible rattling of the parts. Consequently, as the bearings wear, the nut will gradually be tightened upon the bolt, this being done without requiring any inspection on attention whatever.

To avoid an undue straining of the necessarily small latching finger 17, I desirably supplement the action of this finger by auxiliary means for securing the latching member to the shank of the bolt both against rotation and against backward movement longitudinally of the bolt shank. For this purpose I preferably provide the outer end of the latching member with a transverse slot 19 (which may be considerably deeper than the thickness of the flange 13) and provide the auxiliary head 14 of the bolt shank with a transverse bore through which a fastening element, such as a spring cotter 20, may be inserted. This bore is so located with respect to the notch 18 that the groove 19 alines with the said transverse bore in the bolt shank and the bottom of the slot 19 is preferably substantially tangential with the inner edge of the said transverse bore when the latching member is in this position. Consequently, the grooves 19 furnishes a convenient guide for the insertion of the spring cotter 20 and the cotter when inserted bears against the bottom of this slot 19, thus locking the latching member both against rotation and against rearward sliding. To facilitate the insertion of the spring cotter I also desirably shorten the flange 13 in a direction longitudinally of the said slot or substantially as shown in Figs. 2 and 3.

With my bolt thus arranged, it will be obvious that the spring-tensioned latching arrangement can readily be attached without the use of tools, so that it can readily be employed in relatively inaccessible places, as for example in connection with the No. 4 connecting rod on a Ford automobile.

For maximum effectiveness, I desirably employ a coiled spring having a substantially barrel-shaped longitudinal section, thereby causing the tensioning to come first on the medial portion and also reducing the chance of having spring portions squeezed between the opposed ends of the nut and the latching member. I also desirably give a somewhat less steep but correspondingly directed taper to the portion of the nut and the latching member housed by the spring, so that these portions will effectively guide the spring and facilitate a handling of the portion of my appliance which is detachable from the shank of the bolt. However, while I have illustrated and described my invention in a highly desirable embodiment, I do not wish to be limited to the details of the construction and arrangement thus disclosed, it being obvious that these might be modified in many ways without departing from the spirit of my invention or from the appended claims. Neither do I wish to be limited to its use in connection with connecting rods, as it obviously might be employed for a great many other purposes.

I claim as my invention:

1. Means for automatically tightening a nut on a bolt shank which has an unthreaded and transversely perforated tip, comprising an unthreaded latching member sleeved on the said tip and having an integral portion thereof interlocked with the said tip to prevent movement of the latching member either rotationally or away from the nut, a spiral spring interlocked at its ends respectively with the nut and the latching member and continuously tending to tighten the nut on the bolt, and anchoring means extending through the perforation in the tip and interlocked with the latching member to prevent movement of the latter away from the nut.

2. A self-tightening bolt comprising a threaded and headed shank equipped at its free end with a secondary head having a longitudinal groove leading from the tip thereof to a peripheral groove underhanging the secondary head, a nut threaded on the shank, a latching member sleeved upon the head and having an inwardly directed finger underhanging the secondary head, the secondary head having on its inner end a recess spaced from the said longitudinal groove and disposed for interlocking with the said finger, and a spiral spring connecting the nut with the latching member.

3. A self-tightening bolt comprising a threaded and headed shank equipped at its free end with a secondary head having a longitudinal groove leading from the tip thereof to a peripheral groove underhanging the secondary head, a nut threaded on the shank, a latching member sleeved upon the secondary head and having an inwardly directed finger underhanging the secondary head, and a spiral spring connecting the nut with the latching member.

4. A self-tightening bolt comprising a threaded and headed shank equipped at its free end with a secondary head having a longitudinal groove leading from the tip thereof to a peripheral groove underhanging the secondary head, a nut threaded on the shank, a latching member sleeved upon the secondary head and having an inwardly directed finger underhanging the secondary head, and a spiral spring connecting the nut with the latching member; the spring being substantially barrel shaped, and the nut and latching members having opposed portions housed by the spring and correspondingly shaped to maintain them in close axial alinement with the spring so as to facilitate the attaching or detaching with respect to the bolt shank of the nut, spring and latching member.

5. A self-tightening bolt as per claim 3, in combination with auxiliary means for locking the latching member to the shank of the bolt, the latching member being formed for guiding the attaching of the said auxiliary means.

6. A self-tightening bolt as per claim 3, in combination with anchoring means for locking the latching member to the shank of the bolt, the latching member having a groove on its outer face to receive a portion of the said anchoring means, the secondary head having a transverse bore, the means for locking the latching member against rotation being so disposed as to bring the said groove into alinement with the said transverse bore to facilitate the insertion of a fastening element through the said bore.

7. A self-tightening bolt as per claim 3, in combination with auxiliary means for locking the latching member to the shank of the bolt, the latching member being formed for guiding the attaching of the said auxiliary means, the portion of the bolt shank back of the said secondary head being formed for preventing an excessive rotation of the latching member in the spring-winding direction only after a tensioning rotational movement of the spring.

8. A self-tightening bolt for clamping elements of predetermined joint thickness, comprising a bolt shank equipped with a head engaging one side of the said elements, a nut threaded on the said shank and engaging the other side of the said elements, a latching member mounted on the shank beyond the nut, a spiral spring interposed between the nut and the latching member, an anchoring member extending through the shank and locking the latching member both against rotation on the shank and against movement away from the nut, and relatively interlocking means carried respectively by the shank and the latching member and arranged for interlocking when the spring has been rotated to a predetermined extent to tension the spring; the latching member being formed for permitting the attaching of the anchoring member only when the said means are relatively interlocked, thereby compelling the spring to be tensioned before the latching member can be attached.

Signed at Davenport, Iowa, November 14th, 1921.

ALBERT A. ADAMS.